United States Patent
Irons et al.

(10) Patent No.: US 9,355,263 B2
(45) Date of Patent: May 31, 2016

(54) VERIFYING AUTHORIZATION TO DESTROY A PHYSICAL DOCUMENT BEFORE DESTROYING THE PHYSICAL DOCUMENT

(71) Applicant: DocSolid LLC, Phoenix, AZ (US)

(72) Inventors: Steven W. Irons, Phoenix, AZ (US); David R. Guilbault, Scottsdale, AZ (US); Eric R. Lynn, Phoenix, AZ (US)

(73) Assignee: DocSolid LLC, Phoenix, AZ (US)

( * ) Notice: Subject to any disclaimer, the term of this patent is extended or adjusted under 35 U.S.C. 154(b) by 25 days.

(21) Appl. No.: 14/507,117

(22) Filed: Oct. 6, 2014

(65) Prior Publication Data

US 2015/0235034 A1    Aug. 20, 2015

Related U.S. Application Data

(63) Continuation-in-part of application No. 14/181,940, filed on Feb. 17, 2014, now Pat. No. 9,025,213.

(51) Int. Cl.
*G06F 21/60* (2013.01)
*G06F 17/24* (2006.01)

(52) U.S. Cl.
CPC .............. *G06F 21/604* (2013.01); *G06F 17/24* (2013.01)

(58) Field of Classification Search
CPC . G06F 21/10; G06F 21/6218; G06F 21/6245; G06F 21/62; H04L 63/10
See application file for complete search history.

(56) References Cited

U.S. PATENT DOCUMENTS

| | | | |
|---|---|---|---|
| 6,192,165 B1 | 2/2001 | Irons | |
| 6,427,032 B1 * | 7/2002 | Irons | G06F 17/30011 382/306 |
| 6,674,924 B2 * | 1/2004 | Wright | G06F 17/30011 382/306 |
| 7,182,259 B2 * | 2/2007 | Lubow | G06K 1/121 235/437 |
| 7,606,831 B2 * | 10/2009 | Quinn | G06K 17/00 |
| 7,798,417 B2 | 9/2010 | Snyder et al. | |
| 8,194,272 B2 * | 6/2012 | Yoshizumi | G06F 3/1204 358/1.13 |
| 8,194,274 B2 | 6/2012 | Babbrah et al. | |
| 8,375,324 B1 * | 2/2013 | Zubizarreta | G06Q 10/10 715/733 |
| 9,025,213 B1 * | 5/2015 | Irons | H04N 1/00663 358/403 |
| 2002/0111960 A1 | 8/2002 | Irons et al. | |
| 2003/0115162 A1 * | 6/2003 | Konick | G06Q 10/08 705/404 |
| 2006/0184522 A1 * | 8/2006 | McFarland | G06F 21/608 |
| 2008/0163364 A1 * | 7/2008 | Ferlitsch | G06F 17/30011 726/21 |
| 2008/0239328 A1 * | 10/2008 | Mariotti | H04N 1/32 358/1.1 |
| 2009/0037444 A1 * | 2/2009 | Stapleton | G06F 17/30011 |
| 2009/0070348 A1 * | 3/2009 | Uejo | G06F 17/30011 |

* cited by examiner

*Primary Examiner* — Yonas Bayou
(74) *Attorney, Agent, or Firm* — Martin & Associates, LLC; Derek P. Martin

(57) ABSTRACT

A document processing system allows specifying disposition of a paper document at the time a reservation for the document is created in the document processing system. Quality assurance processing after scanning assures all needed processing is performed for the paper document and the corresponding electronic document. Once the quality assurance processing is complete, the disposition of the paper document is scheduled according to the specified disposition policy for the paper document. When the specified disposition policy for a document indicates the document needs to be destroyed, a user scans the unique identifier on the physical document at a first location, receives verification the document should be destroyed, and places the document in a container for documents to be destroyed. At a second location, a user scans the unique identifier on the document and receives verification the document should be destroyed. The physical document may then be destroyed.

19 Claims, 11 Drawing Sheets

| Sample1 Document Disposition Policy |
|---|
| Shred Paper Document Immediately |
| Purge Electronic Document 5 years after file is closed |

| Sample2 Document Disposition Policy |
|---|
| Keep Paper Document forever, store in Location X |
| Retain Electronic Document forever |

| Sample3 Document Disposition Policy |
|---|
| Shred Paper Document After 6 months |

Document Reservation Session

| Profile Document | Document Disposition |

1200

- Client #: 10543
- Client: Awesome Engineering PC
- Matter #: 105
- Doc Type: Tax Return
- Author: Jan Brown
- Notes: Signed 2012 Federal Tax Return as filed
- Date: 04/15/2013

Label Number: 123987

☐ Print Cover Sheet

[ OK ]   [ Cancel ]

FIG. 12

Document Reservation Session

Profile Document | Document Disposition

1300

Disposition Policy for Paper Document:

☒ Default: Shred immediately
☐ Default for Document Type
☐ User Select: Shred in 6 months Disposition Policy for Electronic Document:

☐ None
☐ Default for Document Type
☒ User Select: Purge after 5 years

Notes

OK    Cancel

FIG. 13

| Document Type | Default Disposition Policy |
|---|---|
| Tax Return | Shred after 5 years |
| Will | Keep Forever |

FIG. 14

VERIFYING AUTHORIZATION TO DESTROY A PHYSICAL DOCUMENT BEFORE DESTROYING THE PHYSICAL DOCUMENT

BACKGROUND

1. Technical Field

This disclosure generally relates to processing of documents, and more specifically relates to disposition of documents after scanning.

2. Background Art

Computer systems have vastly improved the efficiency of many modern workers by providing ways to quickly and efficiently generate and handle electronic documents. Many software tools have been developed that generate and/or process electronic documents in various ways, including word processors, spreadsheets, databases, scanning software, web page development systems, content management systems, hypertext markup language (HTML), extensible markup language (XML), etc. It has long been the goal of many people in the information processing field to realize a "paperless office", which means an office where physical paper documents are completely replaced with electronic documents. One impediment to realizing the goal of a paperless office is the great number of different types of documents that a typical business receives from outside sources that must be processed.

When a paper document is received by a business that is striving to realize the goal of a paperless office, the paper document is typically scanned into electronic form. However, in order for the document to be digitally filed in a structured filing system, the document must have indexing information added to the scanned document. Examples of indexing information include: document type, customer number, contract number, dollar amount, and other suitable metadata that describes the document. The process of manually entering indexing information for each scanned document has been a significant bottleneck in the realization of the goal of a paperless office. For each paper document that is scanned, a human operator must scan the document, then manually enter indexing information to allow the document processing systems to recognize, store and retrieve the new document. With a company that receives hundreds or thousands of paper documents each day, this requires a dedication of significant resources to scan the documents and enter the corresponding index information. Many companies prefer to do business by processing the papers instead of dedicating the resources to adapt their business systems to converting the papers to electronic documents, then processing the electronic documents.

Various systems have been developed to allow a user to more efficiently enter indexing information for a document. For example, U.S. Pat. Nos. 6,192,165 and 6,427,032 owned by ImageTag, Inc. disclose systems in which a user creates index information in a record in a database for a paper document before the document is scanned, places a label with a unique identifier on the paper document, then scans the paper document. The system detects the label with the unique identifier in the scanned image, locates the index record in the database that corresponds to the unique identifier, then stores the scanned document with the index record in the database.

One problem that has not been adequately addressed is disposition of the paper document after scanning Some companies keep the paper documents in long-term storage even though the documents are available in electronic form. This practice can be very costly. Many companies that have invested in getting their documents into electronic form still do not have a way to specify disposition for individual documents. As a result, many paper documents are stored that could be disposed of, increasing the company's total document management costs due to the archiving of paper documents.

BRIEF SUMMARY

A document processing system allows specifying disposition of a document at the time a reservation for the document is created in the document processing system. A default disposition policy can be selected, a different defined disposition policy can be selected, or a new disposition policy can be created. Quality assurance processing after scanning assures all needed processing is performed for the paper document and the corresponding electronic document. Once the quality assurance processing is complete, the disposition of the document is scheduled according to the specified disposition policy for the document. When the specified disposition policy for a document indicates it needs to be destroyed, a user scans the unique identifier on the physical document at a first location, receives verification the document should be destroyed, and places the document in a container for documents to be destroyed. At a second location, a user scans the unique identifier on the document and receives verification the document should be destroyed. Once the user at the second location receives verification the physical document may be destroyed, the user can then destroy the physical document.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 12 is a sample display showing a document reservation session for a document showing metadata entered by a user for the document;

FIG. 13 is a sample display showing a document reservation session for a document that shows how a user can define a disposition policy for the document during the reservation session;

FIG. 14 is a table showing two default disposition policies according to document type;

DETAILED DESCRIPTION

The claims and disclosure herein provide a document processing system that allows specifying disposition of a document at the time a reservation for the document is created in the document processing system. A default disposition policy can be selected, a different defined disposition policy can be selected, or a new disposition policy can be created. Quality assurance processing after scanning assures all needed processing is performed for the paper document and the corresponding electronic document. Once the quality assurance processing is complete, the disposition of the document is scheduled according to the specified disposition policy for the document. When the specified disposition policy for a document indicates it needs to be destroyed, a user scans the unique identifier on the physical document at a first location, receives verification the document should be destroyed, and places the document in a container for documents to be destroyed. At a second location, a user scans the unique identifier on the document and receives verification the document should be destroyed. Once the user at the second location receives verification the physical document may be destroyed, the user can then destroy the physical document.

Figure 2:
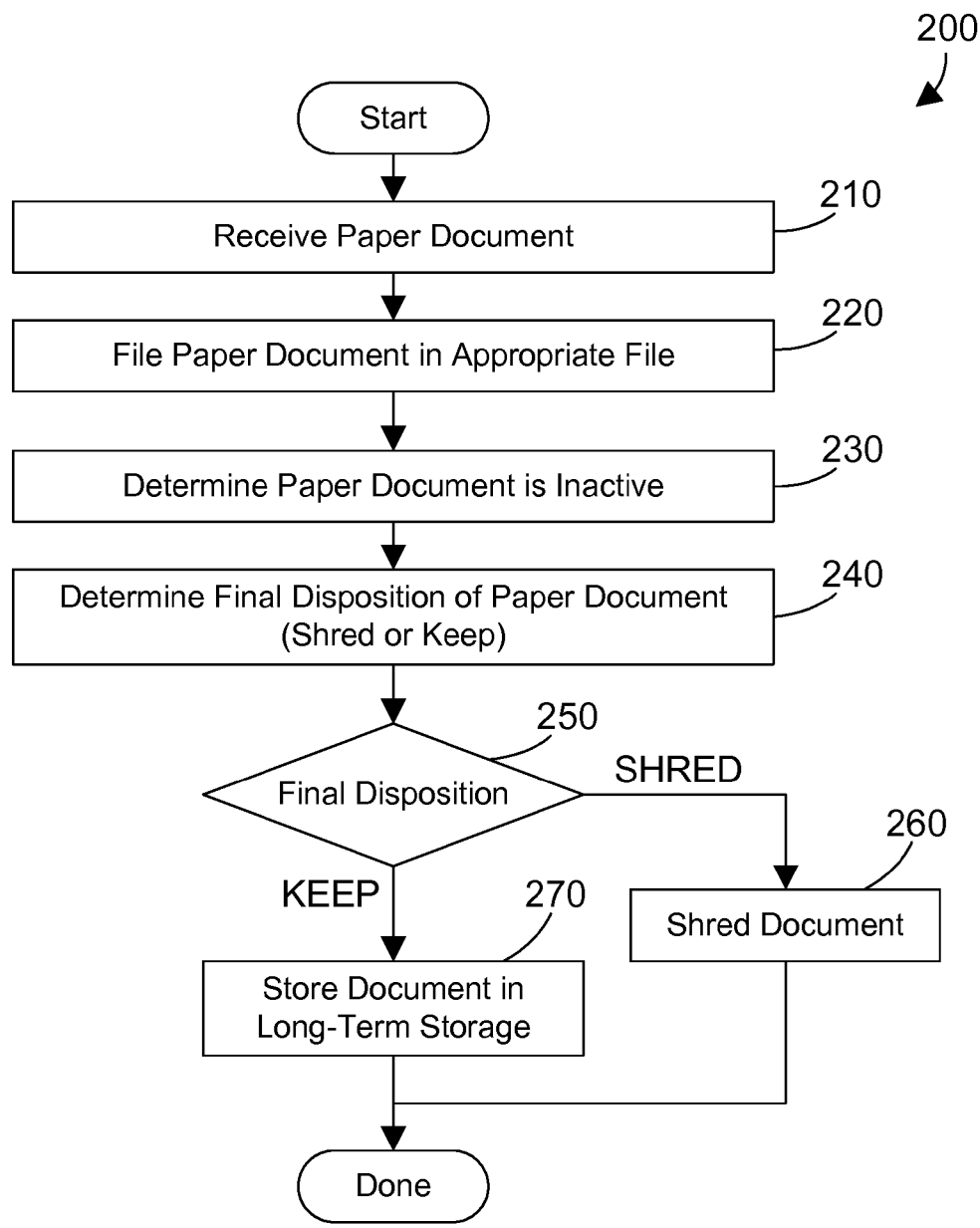
FIG. 2 is a flow diagram of a prior art method for handling paper documents.

Some background information is now presented to give context that will aid the reader in understanding the discussion below. Referring to FIG. 2, a prior art method 200 represents how paper documents have been handled in the past in companies who have defined policies for handling paper documents. A paper document is received (step 210). The paper document is then filed in the appropriate file (step 220). Note the term "appropriate file" in method 200 refers to a paper file folder stored in a filing cabinet or other suitable storage system for paper files. At some point the document is determined to be inactive (step 230). For example, in a law firm, the paper document can become inactive when a file for a particular matter is closed. The final disposition of the paper document is determined (step 240). When the final disposition is to shred the document (step 250=SHRED), the document is shredded (step 260). When the final disposition of the document is to keep the document (step 250=KEEP), the document is stored in long-term storage (step 270). Many companies, especially law firms, have implemented policies that keep inactive documents in long-term storage for a long time. This often requires off-site storage of documents in a warehouse. Needless to say, the expense associated with boxing the document, identifying which files and documents are in each box, and transporting the boxes of documents to the warehouse, increase the cost of dealing with the document. In addition, the ongoing cost of maintaining the warehouse can become significant. Some companies are also finding that long-term storage of archived documents can be undesirable when there is no document retention policy in place to destroy documents after some defined time period. For example, some companies have retained documents in long-term storage that contain information that can be damaging to the company if the company is ever sued. As a result, many companies have made efforts to more actively manage their document retention and destruction processes.

Figure 3:
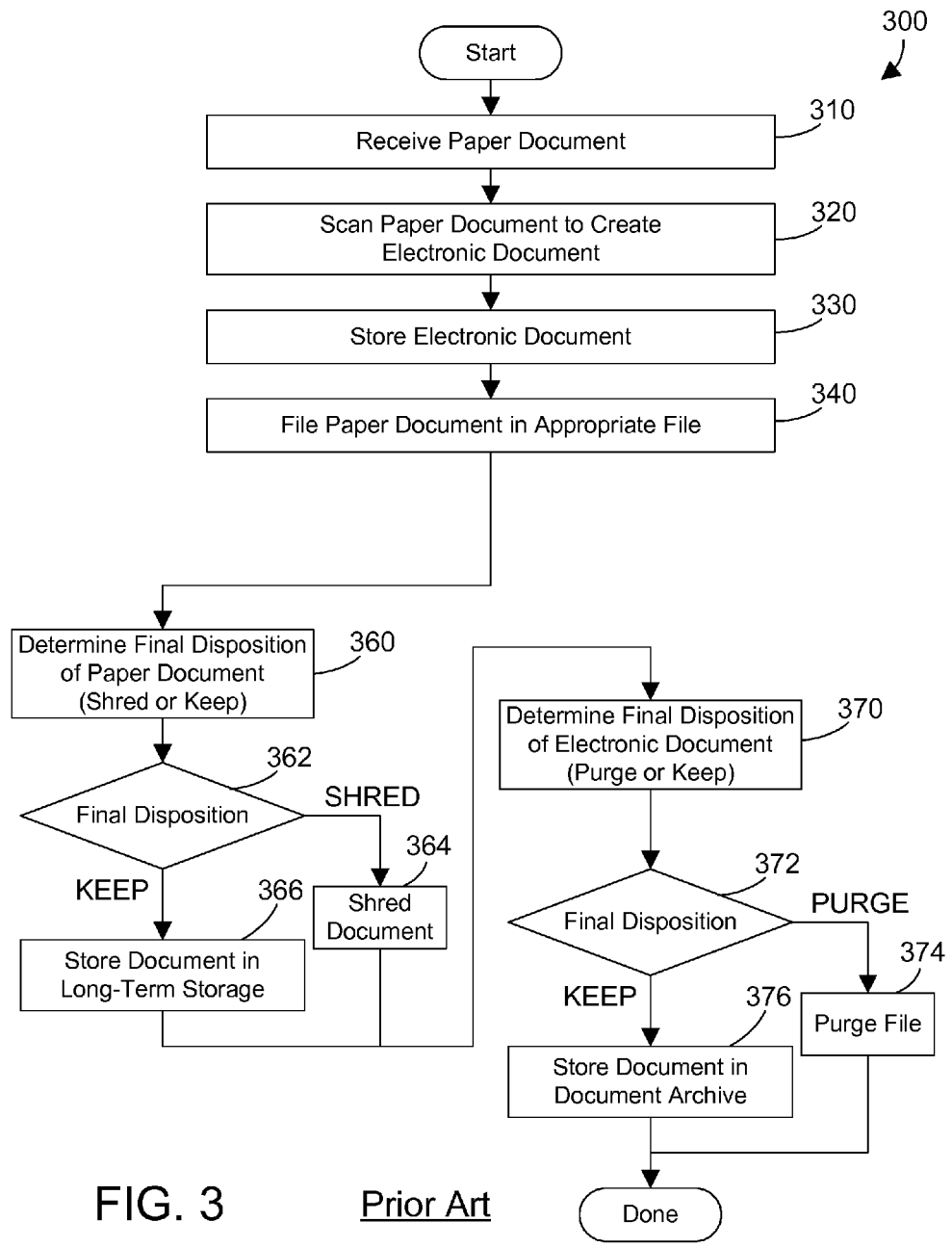
FIG. 3 is a flow diagram of a prior art method for handling both paper and electronic documents.

Referring to FIG. 3, a prior art method 300 shows how the process of managing documents is complicated when both paper documents and electronic documents must be managed. A paper document is received (step 310). The paper document is scanned to create an electronic document (step 320). The electronic document is then stored (step 330) and the paper document is filed in the appropriate paper file (step 340). At an appropriate point in time, a final disposition of the paper document is determined (step 360). When the final disposition of the paper document is to shred the paper document (step 362=SHRED), the paper document is shredded (step 364). When the final disposition of the paper document is to keep the document (step 362=KEEP), the paper document is stored in long-term storage (step 366). Note there may be other final dispositions of the paper document not shown in FIG. 3, such as to mail the paper document to the client. The final disposition of the electronic document is also determined (step 370). When the final disposition of the electronic document is to purge the electronic document (step 374=PURGE), the electronic document is purged (step 374), which means the electronic document is deleted. This may also include deleting any backups of the electronic document so the electronic document is literally gone and cannot be recovered later. When the final disposition of the electronic document is to keep the electronic document (step 372=KEEP), the electronic document is stored in a suitable document archive for electronic documents (step 376). Note the suitable document archive could be the same location where the electronic document was originally stored, or can be a different location.

FIG. 3 makes it clear that when a company scans documents, it must separately manage the paper and the electronic documents. The final disposition of the paper document may be different than the final disposition of the electronic document. A company who manages both paper and electronic documents typically has separate processes that manage disposition of the paper and electronic documents. These processes are not integrated into the process for creating the electronic document. In addition, the processes often must accommodate different personalities. For example, a senior lawyer at a law firm may mandate that all of the paper and electronic documents for his files is kept for a minimum of 20 years, even though the law firm policy is to destroy both paper and electronic documents 5 years after a file is closed. Companies are thus faces with trying to integrate various manual processes and computer-based processes in a way that accommodates a wide range of document disposition preferences. What is needed is a more uniform way to specify and manage document disposition.

Figure 4:
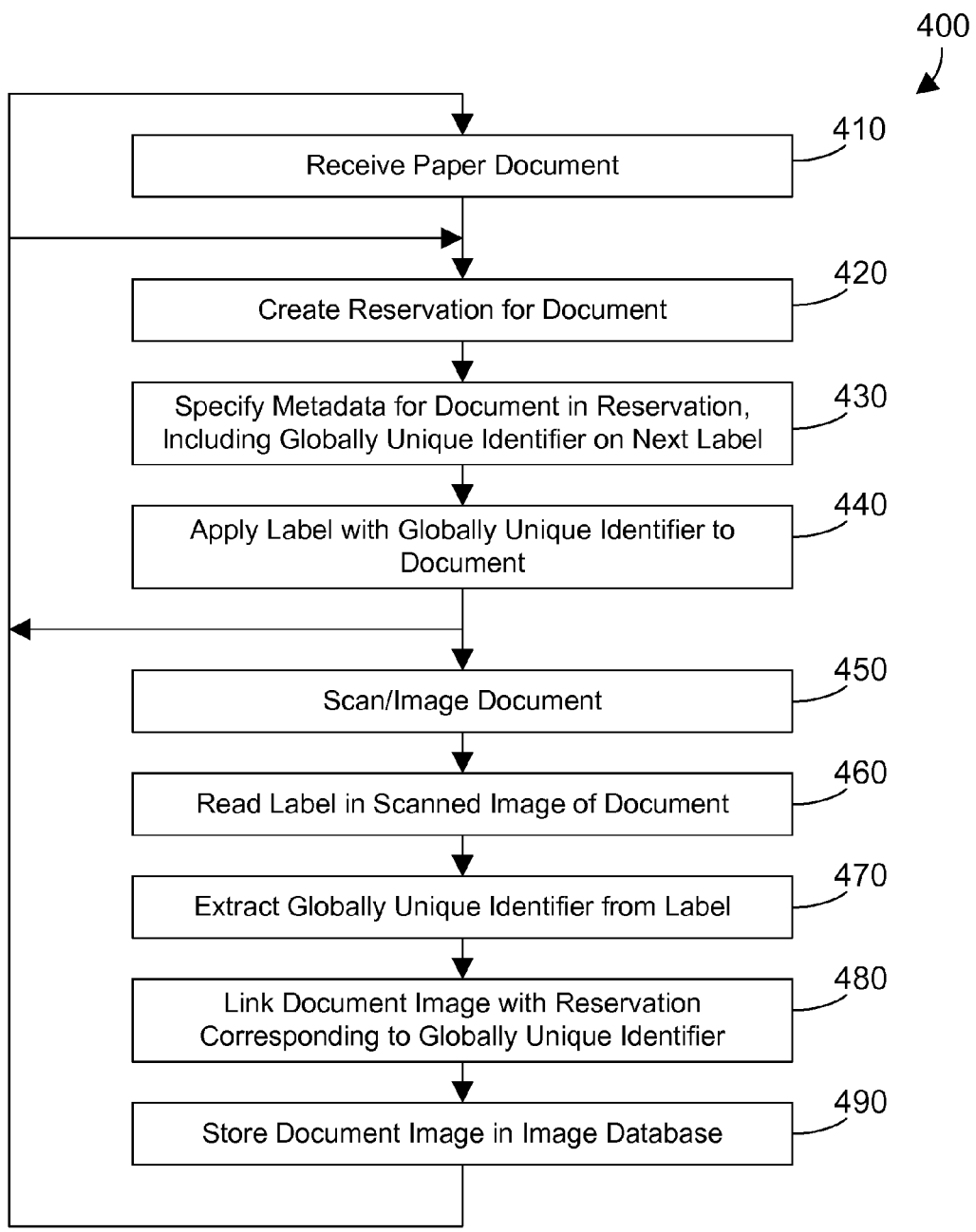
FIG. 4 is a flow diagram of a prior art method for processing paper documents into electronic documents.

As discussed above in the Background section, ImageTag, Inc. developed systems that allow a user to create index information in a record in a database for a paper document before the paper document is scanned, place a label with a unique identifier on the paper document, then scan the paper document. The system detects the label with the unique identifier, locates the index record in the database that corresponds to the unique identifier on the label, then stores the scanned document with the index record in the database. Method 400 in FIG. 4 is representative of a method performed by a product known as KwikTag marketed by ImageTag, Inc. A paper document is received (step 410). A reservation for the document is created (step 420). A reservation is created typically by invoking the KwikTag software to perform a "tagging session". During the tagging session, the user specifies metadata for the document, including the globally unique identifier on the next label in the user's label dispenser (step 430). The user then applies the corresponding label with the globally unique identifier to the document (step 440). In the most preferred implementation, the user applies the corresponding label to the paper document by placing an adhesive label on the first page of the document. In an alternative implementation, the user applies the corresponding label to the paper document by printing a cover sheet with the label. At some later point in time, the document is scanned (step 450), which creates one or more images that represent the scanned document. For the discussion herein, the "scanned image" includes all of the pages in the document for a multi-page document. The label on the document is read (step 460). The globally unique identifier on the label is extracted from the label (step 470). The document image is then linked with the reservation corresponding to the globally unique identifier (step 480). Note the reservation was created and correlated to the globally unique identifier during the previous tagging session. The document image is then stored in the image database (step 490). The metadata entered by the user when the reservation was created may be stored in a database separate from the document image, or may be stored as part of the document image file. The metadata entered by the user in FIG. 4 all relates to the electronic document that will exist once the paper document is scanned. None of the metadata entered by the user in FIG. 4 relates to disposition of the paper document.

Figure 1:
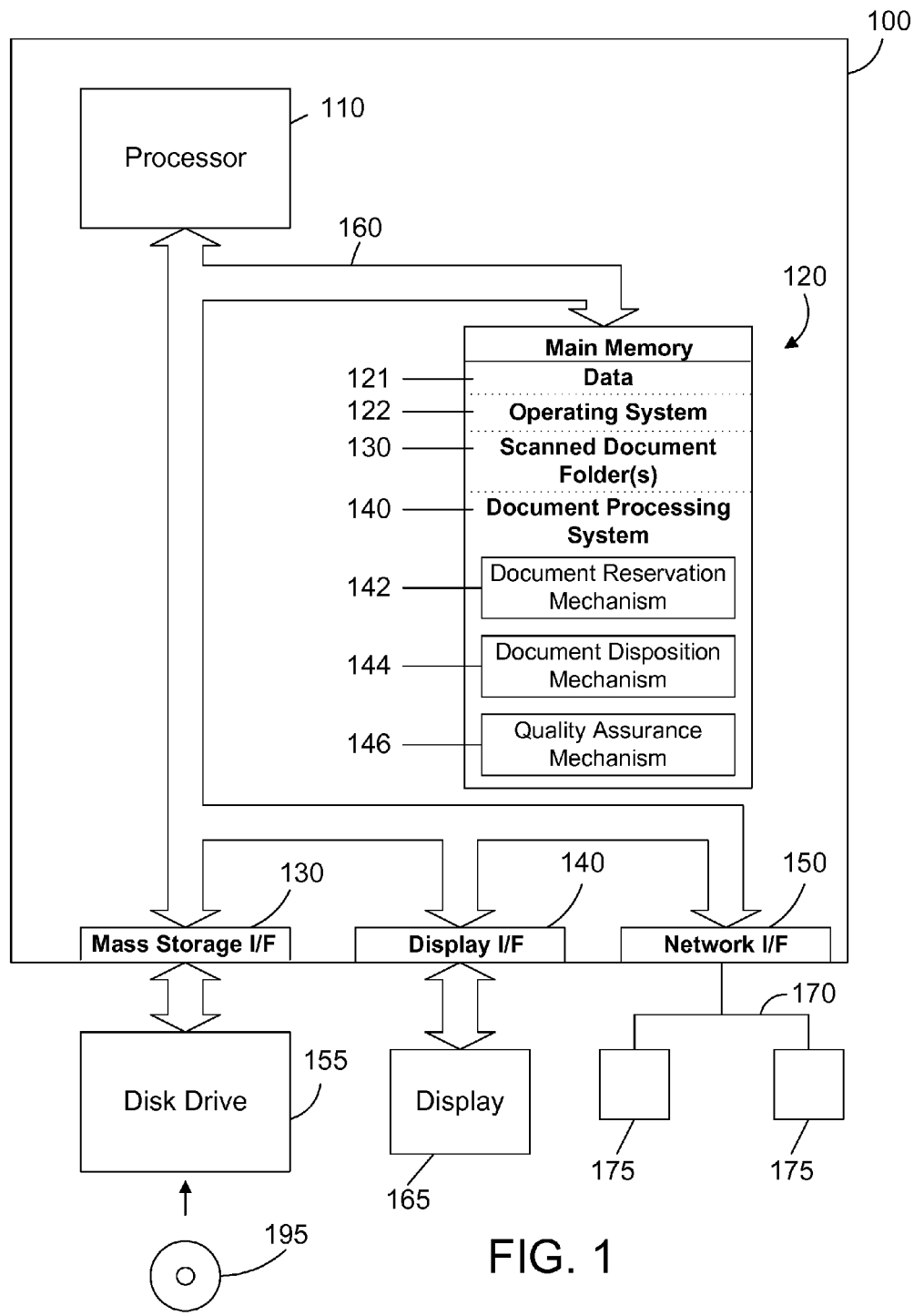
FIG. 1 is a block diagram of a computer system that implements a document processing system.

Referring to FIG. 1, computer system 100 is one suitable implementation of a computer system that could implement the document processing system disclosed and claimed herein. Computer system 100 could be any suitable server system, such as an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a disk drive 155, to computer system 100. One specific type of disk drive 155 is a readable and writable CD-RW drive, which may store data to and read data from a CD-RW 195. CD-RW 195 is one suitable example of non-transitory computer readable media.

Main memory 120 preferably contains data 121, an operating system 122, one or more scanned document folders 130, and a document processing system 140. Data 121 represents any data that serves as input to or output from any program in computer system 100. Operating system 122 is a multitasking operating system. Scanned document folder(s) 130 represent one or more folders accessible via a network connection that are the destination for documents scanned by the digital copier/scanners, and that need to be processed by the document processing system 140. While scanned document folder(s) are shown as part of computer system 100 in FIG. 1, one or more scanned document folders could alternatively or in addition reside on a separate computer system on a network, such as a computer system 175 residing on network 170. The document processing system 140 includes a document reservation system 142, a document disposition mechanism 144, and a quality assurance mechanism 146. The document reservation mechanism 142 allows a user to enter metadata that is used to describe a document that needs to be scanned. A unique identifier corresponding to a label is also entered, which creates a "reservation" in the document processing system. In other words, the metadata that describes the scanned document is entered before the document is scanned. The unique identifier on the label allows the scanned document to be later correlated to the reservation for that unique identifier. This allows the metadata for the scanned document that was entered earlier to be automatically associated with the scanned document based on the unique identifier that was entered as part of the metadata for the document during the document reservation session.

The document disposition mechanism 144 allows a user to specify a disposition policy for a paper document. The document disposition mechanism 144 can also provide a prompt to a user when a document needs to be disposed of. The document disposition mechanism can handle specifying disposition of paper documents as well as disposition of electronic documents. However, in some implementations, the document disposition mechanism 144 will be responsible for specifying disposition of paper documents, while specifying disposition of electronic documents is left to other processes or systems. The quality assurance mechanism 146 allows performing any needed quality assurance function with respect to the paper document and/or electronic document. For example, one such quality assurance function is to allow a user to verify a scanned document accurately reflects the paper document before the document is disposed of according to the disposition policy. The mechanisms 142, 144 and 146 in the document processing system 140 are discussed in more detail below with respect to FIGS. 5-13.

Computer system 100 utilizes well known virtual addressing mechanisms that allow the programs of computer system 100 to behave as if they only have access to a large, single storage entity instead of access to multiple, smaller storage entities such as main memory 120 and disk drive 155. Therefore, while data 121, operating system 122, scanned document folder(s) 130, and document processing system 140 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100. In addition, computer system 100 could include one or more virtual machines, with the document processing system 140 running on one of the virtual machines.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a document processing system as disclosed and claimed herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems or other network devices 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the disclosed document processing system may be embodied as a system, method or computer program product. Accordingly, aspects of the document processing system may take the form of an entirely hardware embodiment, an entirely software embodiment (including firmware, resident software, micro-code, etc.) or an embodiment combining software and hardware aspects that may all generally be referred to herein as a "circuit," "module" or "system."Furthermore, aspects of the document processing system may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the document processing system may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the document processing system are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figures 5, 6, 7, 8:
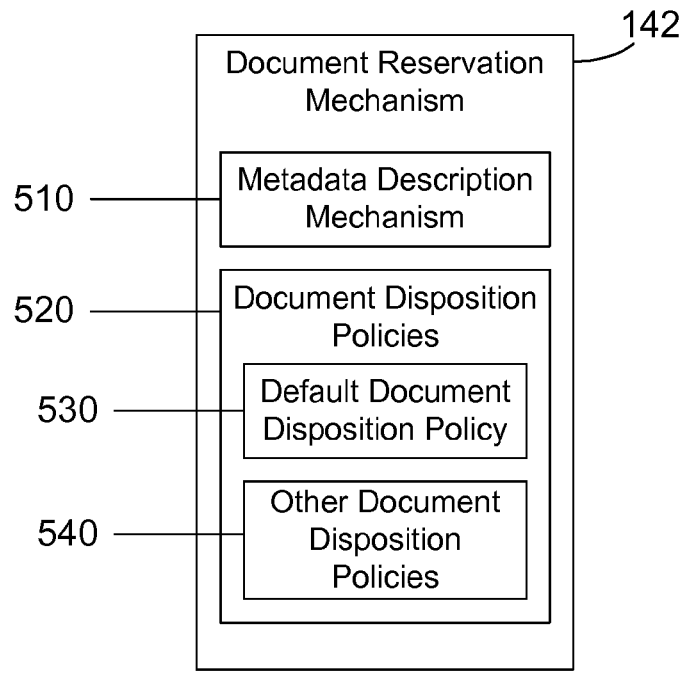
FIG. 5 is a block diagram that shows additional details of the document reservation mechanism 142 shown in FIG. 1.
FIG. 6 is a block diagram showing a first sample document disposition policy.
FIG. 7 is a block diagram showing a second sample document disposition policy.
FIG. 8 is a block diagram showing a third sample document disposition policy.

The disclosure and claims herein improve on the prior art method 400 shown in FIG. 4 by allowing the user to specify a disposition policy for the paper document during the tagging session, and to also optionally specify a disposition policy for the corresponding electronic document during the tagging session as well. Referring to FIG. 5, the document reservation mechanism 142 in FIG. 1 is shown to include a metadata description mechanism 510 and one or more document disposition policies 520. The document disposition policies 520 may include a default document disposition policy 530 as well as one or more other document disposition policies 540. Note the document disposition policies 520 could also include multiple default disposition policies according to document type. Thus, tax returns could have a default disposition policy, while wills have a different default disposition policy. Of course, a user can always define a new document disposition policy if none of the existing document disposition policies will do. The document disposition policies include disposition policies relating to physical paper documents, and can optionally also include disposition policies relating to the corresponding electronic documents.

Examples of suitable document disposition policies are shown in FIGS. 6-8. The Sample1 Document Disposition Policy in FIG. 6 specifies to shred the paper document immediately and purge the electronic document five years after the file is closed. The Sample2 Document Disposition Policy in FIG. 7 specifies to keep the paper document forever and retain the electronic document forever. The Sample3 Document Disposition Policy in FIG. 8 specifies to shred the paper document after 6 months. Note the two sample document disposition policies in FIGS. 6 and 7 specify disposition of both the paper document as well as the electronic document, while the sample document disposition policy in FIG. 8 only specifies disposition of the paper document. The document processing system disclosed and claimed herein may work in conjunction with any suitable document management software or process, whether computer-based or manual, that can separately determine disposition of electronic documents. For example, software or a manual process that is separate from the document processing system disclosed herein could determine when and how to dispose of electronic documents. This allows coordination between disposition of paper documents and disposition of the corresponding electronic documents. The document disposition policy disclosed herein extends to specifying disposition of the paper document, and also optionally specifying disposition of the electronic document.

It is also within the scope of the disclosure and claims herein for the document processing system 140 to pass document disposition information to a different process or program. Thus, for the example in FIG. 6 that specifies to purge the electronic document 5 years after the file is closed, the document processing system 140 could notify any suitable document management software or process of the need to purge the electronic document 5 years after the file is closed. By passing document disposition information to existing external processes or software, the document processing system 140 can be integrated into a large number of different systems and configurations.

Note the term "disposition" of a document means what is ultimately done with the document, and does not necessarily mean the document is "disposed of" in the sense of being destroyed. As shown in FIG. 7, disposition of a paper document may include keeping the paper document, and disposition of an electronic document may include retaining the electronic document. Note also that "document retention" and "document destruction" may often be thought of as different sides of the same coin. Thus, when a company has a document retention policy, the policy typically specifies time periods for retaining documents, after which the documents may be destroyed. Thus, a document retention policy can also inherently be a document destruction policy. For the example given in FIG. 6, the document disposition policy specifies to shred the paper document immediately, which implies no retention of the paper document. Similarly, the document disposition policy in FIG. 6 specifies to purge the electronic document five years after the file is closed, which means to retain the electronic document for five years, after which the electronic document can be purged. The disclosure and claims herein extend to any suitable document disposition policy however expressed, whether currently known or developed in the future. For example, disposition of a paper document could include other options besides keeping and shredding, such as sending the paper document to the client.

Figures 9, 10:
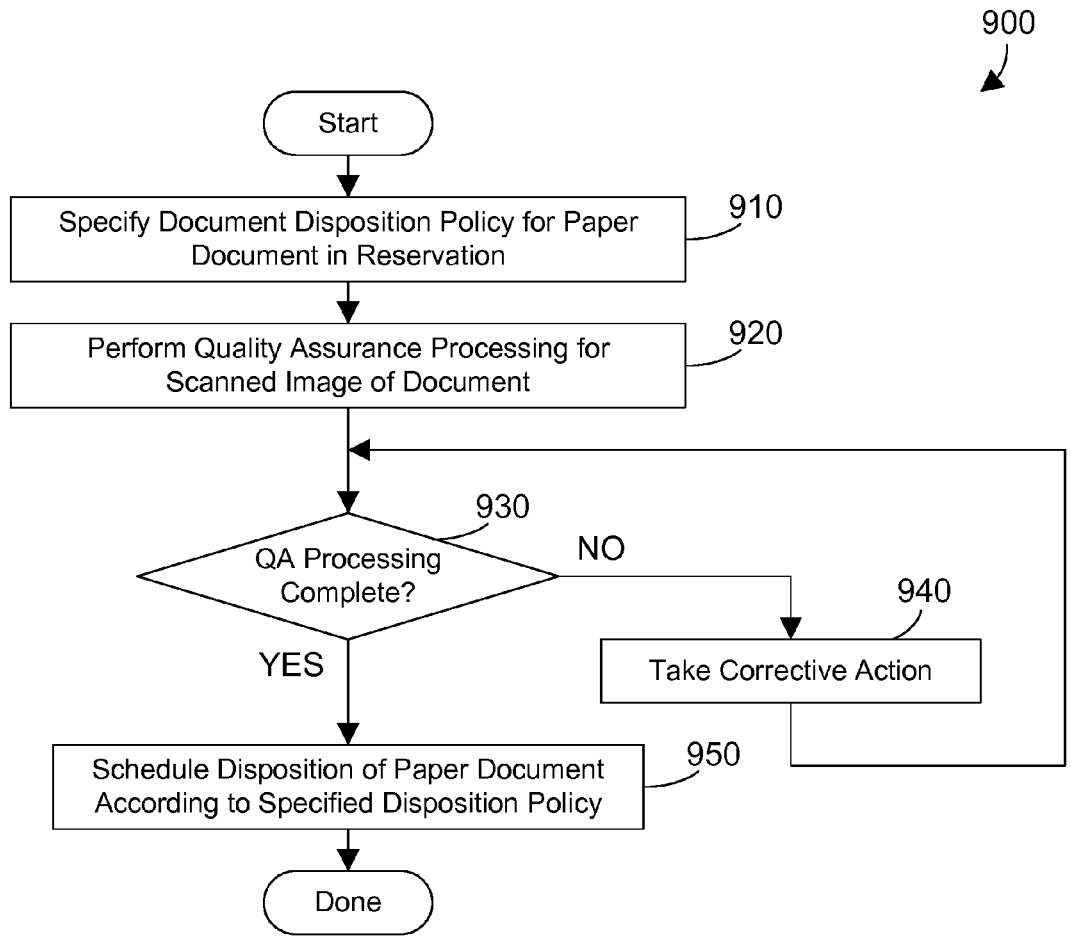
FIG. 9 is a flow diagram of a method for defining and scheduling disposition of a document.
FIG. 10 is a block diagram showing examples of quality assurance processing.

Referring to FIG. 9, a method 900 shows steps that are not currently performed in prior art method 400 shown in FIG. 4 that are performed by the document processing system 140 in FIG. 1. A document disposition policy is specified in the reservation for the paper document (step 910). Once the document is scanned, any needed quality assurance processing for the scanned image of the document is performed (step 920).

Quality assurance (QA) processing can include any suitable processing that could be needed. Examples of quality assurance processing are shown in FIG. 10 to include assure the scanned image exists and is accurate 1010; verify completeness and accuracy of the metadata for the scanned document 1020; verify the scanned document is written to the document management system 1030; verify any needed workflows are triggered 1040; and build an audit trail 1050. Assuring the scanned image exists and is accurate 1010 may include any suitable steps or functions, such as scanning the label on the document with a bar code reader, which provides access to both the metadata for the document as well as the scanned image for the document, assuming the document has already been scanned. This allows a quality assurance user to use existing barcode scanners that are already used for managing paper documents. Assuring the scanned image exists and is accurate 1010 can include the steps of checking to make sure the document image has been captured, making sure the image quality is good, and making sure all pages got scanned. A simple example will illustrate. Let's assume page 2 of the scanned document is upside down, page 3 of the document is missing, and page 4 of the document has part of the text cut off. A human user will inspect the scanned document and notice these issues from a comparison with the paper document (step 930=NO) and take corrective action (step 940). For the simple example above, the corrective action could be rotating page 2 180 degrees, re-scanning pages 3 and 4 of the document, then inserting the re-scanned pages 3 and 4 into the document in the place of pages 3 and 4. Once the corrective action is taken, step 930 will determine whether QA processing is complete (step 930). If not (step 930=NO), more corrective action can be taken (step 940). Once all QA processing is complete (step 930=YES), the disposition of the paper document is scheduled according to the specified disposition policy (step 950).

Verifying completeness and accuracy of the metadata for the scanned document 1020 can include making sure all needed fields are filled out, and making sure the entries in those fields are accurate. Note these fields preferably include all the metadata fields that were available to the user during the tagging session, and may also include other fields as well. Verifying the scanned document is written to the document management system 1030 can include making sure the electronic document is written to the appropriate location in a separate document management system so the document management system can manage the electronic document. Verifying any needed workflows are triggered 1040 can include making sure that any needed processes relating to the document, both manual and computer-based, are initiated. An example of a needed workflow is to send an e-mail to a user notifying the user of something relating to the processing of the document. Building an audit trail 1050 involves tracking each operation performed on a document and who performed that operation so the audit trail includes a complete history of actions taken with respect to the document and the people who took those actions. The audit trail ensures process integrity controls and reports are in place before disposition of the physical document occurs. The specific examples of quality assurance processing shown in FIG. 10 are shown by way of example, and are not limiting. The disclosure and claims herein expressly extend to any quality assurance processing, both manual and computer-based, that needs to be performed as a result of processing the paper document, the electronic document, or both.

Figure 11:
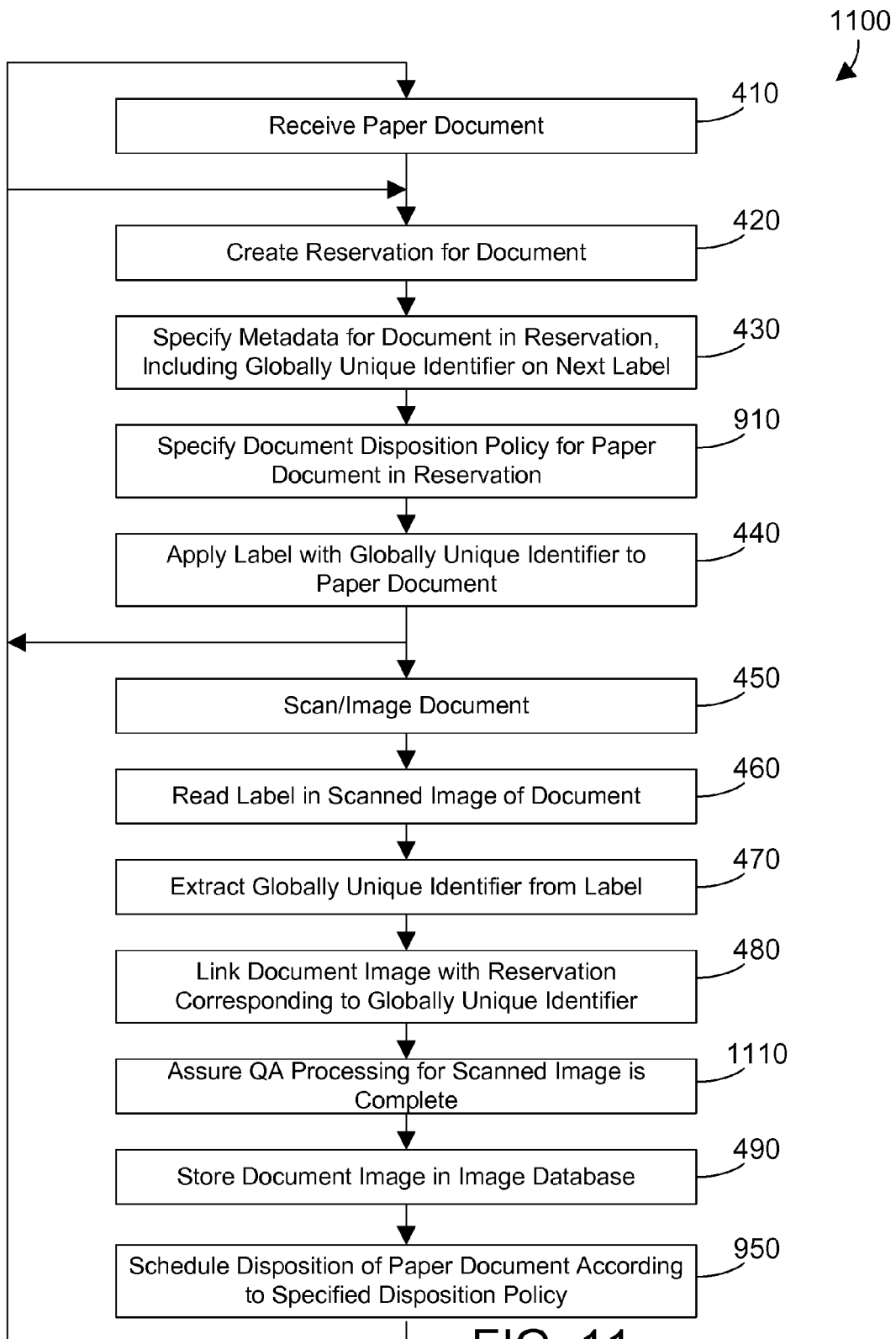
FIG. 11 is a flow diagram of a method for processing documents that includes steps shown in FIG. 9.

FIG. 11 shows a flow diagram of a method 1100 in accordance with the disclosure and claims herein that is one suitable implementation that includes steps shown in method 900 shown in FIG. 9. Note that steps 410, 420, 430, 440, 450, 460, 470, 480 and 490 in method 1100 in FIG. 11 are the same numbered steps as in prior art method 400 in FIG. 4. However, additional steps 910, 1110 and 950 have been added. Step 910 allows the user to specify a disposition policy for the document in the reservation for the document, as shown in step 910 in FIG. 9. Step 950 schedules disposition of the paper document according to the specified disposition policy, as shown in step 950 in FIG. 9. Step 1110 assures QA processing for the scanned image is complete, such as the processing shown in steps 920, 930 and 940 in FIG. 9. Method 1100 thus allows a user to define a disposition policy for a document during a tagging session, and once any appropriate quality assurance processing is performed, the disposition of the document can be scheduled.

A simple example is now given in FIGS. 12 and 13 that illustrates how disposition of a document could be specified during a tagging session in the document reservation system. FIG. 12 shows a display window 1200 that represents a tab "Profile Document" in the document reservation system. For this specific example, the user can enter a client number, a client, a matter number, a document type, an author, notes, and a date. The user can also specify the label number. Note the label number will normally not have to be modified by the user, because the labels are numbered sequentially, which means the document reservation mechanism will automatically fill in the number of the next label in the Label Number field. Or course, if the user needs to change the label number, such as if a label is damaged, the user can enter the correct label number. In addition, some documents, such as tax forms, may not have enough room for a label. In this case a cover sheet may be printed with the barcoded label instead of placing an adhesive label on the document itself. When this is the case, the user can select the "Print Cover Sheet" option shown in FIG. 12. The disclosure and claims herein apply regardless of whether an adhesive label or cover sheet is used. Thus, applying a label to the document can include either applying an adhesive label to the document or printing a label to a coversheet for the document.

The fields in FIG. 12 represent metadata that describes a document. In the most preferred implementation, the user defines this metadata before the document is scanned. Of course, it is equally within the scope of the disclosure and claims herein to create a reservation that includes no metadata or less than all the desired metadata, as long as the label number is identified. The user could then go back and enter the desired metadata at a later time, even after the document is scanned. Once the user has entered all the metadata the user desires to define in the document reservation system, the user clicks on the OK button, which causes a reservation to be created with the specified metadata, including the label number. This reservation can then be matched later to the document image after the document is scanned and the label number on the label is extracted from the scanned image of the document.

In addition to specifying metadata for the document in the window 1200 shown in FIG. 12, the user can also specify a disposition policy for the paper document, and can optionally also define a disposition policy for the electronic document, as shown in window 1300 in FIG. 13. Note the available disposition policies for the paper document include a default disposition policy that can be selected by the user. Note also that different default disposition policies could be specified for different document types, as shown in FIG. 14. Thus, a tax return could have a default disposition policy of shredding after five years, while a will could have a default disposition policy of keeping the paper document forever. Window 1300 could include one or more drop-down lists that include several different defined disposition policies that could be selected by the user. In addition, the user could define a new disposition policy for the document if none of the defined disposition policies will do. Once the user specifies the applicable disposition policy for the document, the user selects the OK button, which causes the disposition policy to be added as metadata to the document reservation. In this manner the disposition policy for a document can be specified at the time a reservation for the document is created. This disposition policy can then be used to determine disposition of the document once all required QA processing is complete.

While the metadata related to document disposition shown in FIG. 13 is metadata stored before the paper document is scanned, this metadata differs from the metadata that profiles the document to be scanned, as shown in FIG. 12. The metadata in FIG. 12 relates to the electronic version of the document to be scanned. The metadata in FIG. 13, in contrast, relates to disposition of the paper document, and can optionally also relate to disposition of the electronic document as well. No known prior art systems allow specifying metadata that relates to disposition of the paper document before the paper document is even scanned.

Figure 15:
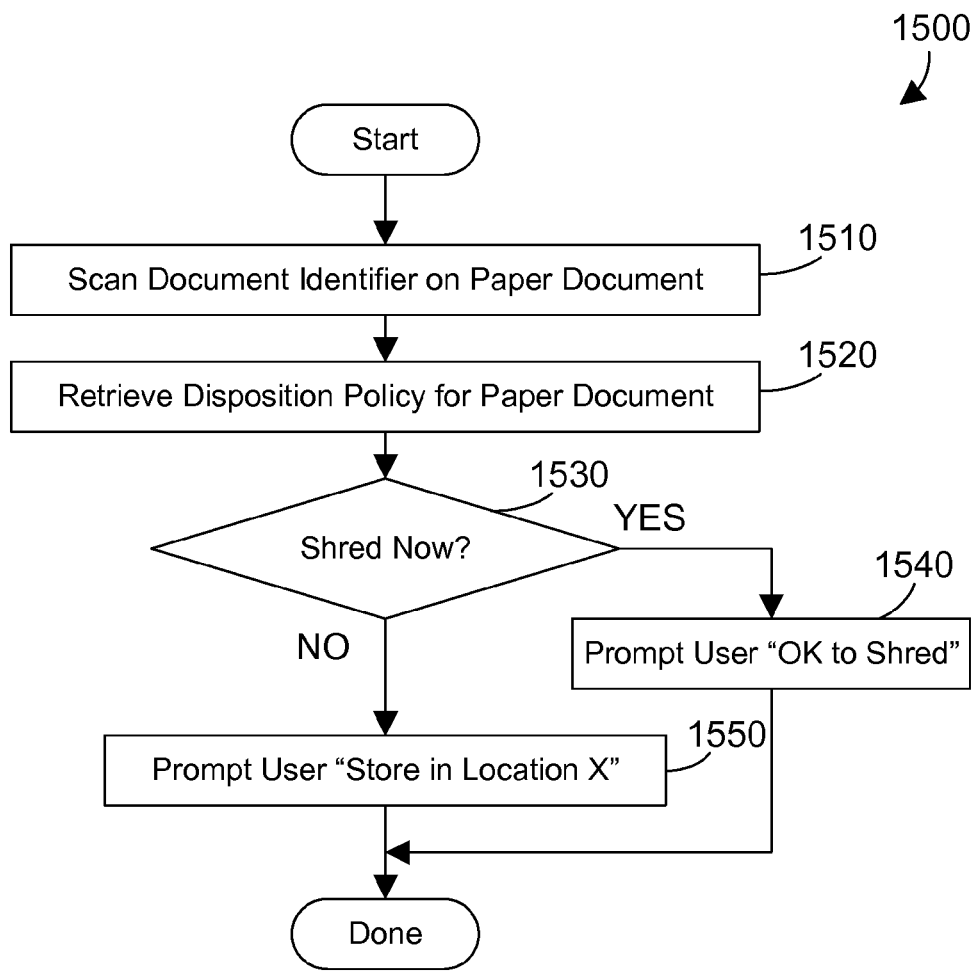
FIG. 15 is a flow diagram of a method for using the disposition policy for a paper document when handling the paper document.

Referring to FIG. 15, a method 1500 shows how the document disposition policy can be used when handling the paper document. The document identifier on the paper document is scanned (step 1510). The identifier can be on a label on the document itself, or on a cover sheet for the document. The identifier may be scanned, for example, using any suitable machine-readable reader, such as a bar code scanner. The disposition policy for the paper document is retrieved (step 1520). When the disposition policy indicates the document can be shredded now (step 1530=YES), the user is prompted "OK to Shred" (step 1540). For example, the disposition policy may indicate the document can be shredded now (step 1530=YES) once the document has been scanned and all needed quality assurance processing has been completed. When the disposition policy does not allow for shredding the document now (step 1530=NO), the user is prompted "Store in Location X" (step 1550). Note method 1500 may be performed some time after the initial quality assurance processing in steps 920, 930 and 940 in FIG. 9, which are also represented in step 1110 in FIG. 11. Thus, the disposition policy can also be used at the back end of the process to make sure a document can be shredded before it is actually shredded. A simple example will illustrate. Let's assume the document processing system has identified many documents for shredding, and these documents are all placed in one or more boxes. As a final check, the user could scan the label on the document just before putting the document into the shredder. If the document should be shredded, the user will receive the "OK to Shred" message. If not, the user will get a different message, indicating the document should not be shredded. The disposition policy thus allows for a final back-end check before a paper document is shredded.

Figure 16:
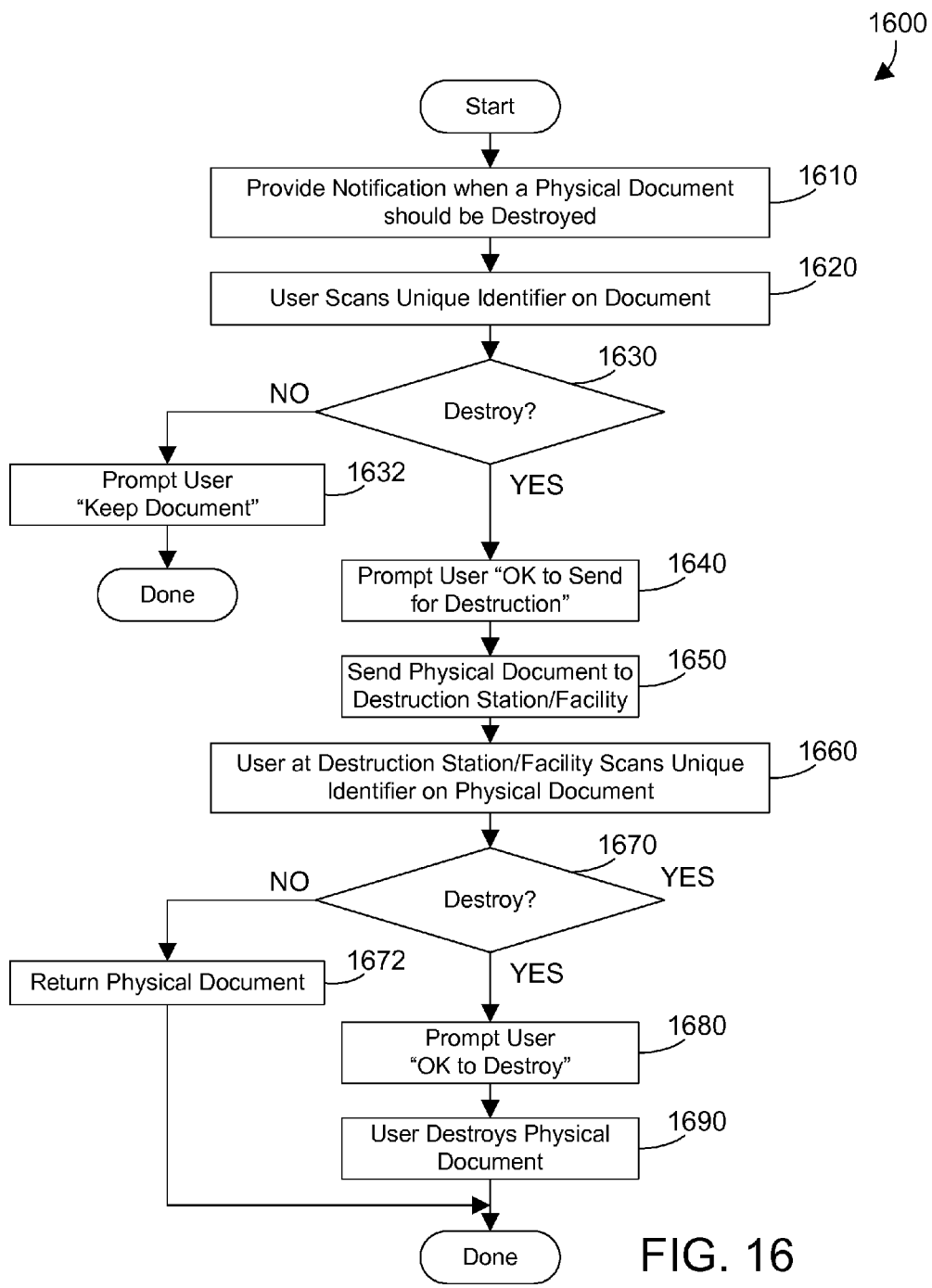
FIG. 16 is a flow diagram of a method for verifying a physical document should be destroyed before destroying the physical document.

Many executives and managers understandably get very nervous about destroying physical documents. The document disposition mechanism allows a check and double-check before destroying a physical document. Referring to FIG. 16, a method 1600 is preferably performed by the document disposition mechanism 144 in FIG. 1, and begins by providing notification when a physical document should be destroyed (step 1610). This notification could happen, for example, to a user in a file room where files are stored. This notification could be the result of the document disposition mechanism monitoring the document disposition policies for many documents, and providing the notification when the document disposition policy for a document is satisfied, indicating the physical document needs to be destroyed. The user then retrieves the document and scans the unique identifier on the document (step 1620). When the document disposition policy does not allow destroying the document (step 1630=NO), the user is prompted to keep (i.e., not destroy) the document (step 1632). Step 1630 is the first check in the double check process for verifying documents should be destroyed. When the document disposition policy is satisfied so the document should be destroyed (step 1630=YES), the user that scanned the document in step 1620 is prompted with a message that indicates the physical document may be destroyed (step 1640). The physical document is then sent to a destruction station or facility (step 1650). This can be done, for example, by placing the physical document in a container for documents to be destroyed, then transporting the container to the destruction station or facility. Some companies perform document destruction in-house, some have off-site document destruction facilities, and some use third party contractors to perform document destruction. With all of these, there are typically special containers that are designated for document destruction. In the prior art, once documents are placed in the containers designated for document destruction, the documents are then destroyed. Method 1600, however, provides a second check at the destruction station or facility to make sure the physical document should be destroyed before destroying the physical document. A user at the destruction station or facility scans the unique identifier on the physical document (step 1660). A check is made to assure the document disposition policy for the document is satisfied, which allows for destroying the physical document. When the document disposition policy is not satisfied, indicating the physical document should not be destroyed (step 1670=NO), the physical document is returned (step 1672). When the document disposition policy is satisfied, indicating the physical document should be destroyed (step 1670=YES), the user is prompted that the physical document can be destroyed (step 1680). The user then destroys the physical document (step 1690) in any suitable way, including shredding, incineration, or any other suitable way to destroy documents, whether currently known or developed in the future. Providing the double-check before destroying documents gives executive and managers another level of assurance that only documents that should be destroyed are actually destroyed.

The figures and specification discussed above thus support an apparatus comprising at least one processor; a memory coupled to the at least one processor; a document processing system residing in the memory and executed by the at least one processor, the document processing system comprising: a document disposition mechanism that provides a notification when a physical document should be destroyed, receives a first scan of a unique identifier on the document at a first location and provides first verification at the first location the document should be destroyed, receives a second scan of the unique identifier on the document at a second location, and provides second verification at the second location the document should be destroyed.

The figures and specification discussed above additionally support a computer-implemented method executed by at least one processor for verifying physical documents should be destroyed, the method comprising: scheduling disposition of a physical document according to a specified disposition policy for the physical document; providing a notification when the physical document should be destroyed according to the specified disposition policy for the physical document; in response to the notification, retrieving the physical document to a first location; performing a first scan in the first location of a unique identifier on the label on the physical document; in response to the first scan, providing a first prompt at the first location that verifies the physical document should be destroyed; in response to the first prompt, placing the physical document in a container of documents to be destroyed; scanning in a second location the unique identifier on the label on the physical document; and in response to the second scan, providing a second prompt at the second location that verifies the physical document should be destroyed.

The figures and specification discussed above further support a computer-implemented method executed by at least one processor for verifying physical documents should be destroyed, the method comprising: creating a reservation for a physical document; specifying in the reservation for the physical document metadata corresponding to the physical document, where the metadata includes a unique identifier of a label that is applied to the physical document and further includes a disposition policy for the physical document; applying the label to the physical document; scanning the physical document to generate an electronic document corresponding to the physical document; reading the unique identifier of the label in the electronic document; linking the electronic document with the reservation for the physical document based on the unique identifier of the label; storing the electronic document in a database; scheduling disposition of the physical document according to the disposition policy for the physical document that was specified by the user during the reservation session for the physical document; providing a notification when the physical document should be destroyed; in response to the notification, retrieving the physical document to a first location; scanning in the first location the unique identifier on the label on the physical document; in response to the first scan, providing a first prompt at the first location that verifies the physical document should be destroyed; scanning in a second location the unique identifier on the label on the physical document; and in response to the second scan, providing a second prompt at the second location that verifies the physical document should be destroyed.

The figures and specification discussed above also support a computer-implemented method executed by at least one processor for verifying physical documents should be destroyed, the method comprising: creating a reservation for a physical document; specifying in the reservation for the physical document metadata corresponding to the physical document, where the metadata includes a unique identifier of a label that is applied to the physical document and further includes a disposition policy for the physical document; applying the label to the physical document; scanning the physical document to generate the electronic document; reading the unique identifier of the label in the electronic document; linking the electronic document with the reservation for the physical document based on the unique identifier of the label; performing quality assurance processing related to the electronic document after the physical document has been scanned to produce the electronic document, wherein the quality assurance processing comprises: comparing the electronic document to the physical document to assure the electronic document accurately represents the physical document; verifying completeness and accuracy of the metadata corresponding to the physical document; verifying the electronic document is written to a document management system; verifying any needed workflows associated with the physical document and the electronic document are triggered; building an audit trail for the physical document; and taking corrective action if any of the quality assurance processing indicates corrective action is needed; storing the electronic document in a database; scheduling disposition of the physical document according to the disposition policy for the physical document that was specified by the user during the reservation session for the physical document; providing a notification when the disposition policy for the physical document is satisfied indicating the physical document should be destroyed; in response to the notification, retrieving the physical document to a first location; scanning in the first location the unique identifier on the label on the physical document; in response to the first scan, providing a first prompt at the first location that verifies the physical document should be destroyed; scanning in a second location the unique identifier on the label on the physical document; and in response to the second scan, providing a second prompt at the second location that verifies the physical document should be destroyed.

In the discussion herein, the terms "scanned document" and "electronic document" are used interchangeably to refer to an electronic file that contains images of the paper document, while the term "paper document" is used herein to refer to the hard copy document in paper form. The discussion herein uses paper documents as one suitable example of physical documents. Note, however, that physical documents can include any physical embodiment of a document, including paper, recordable media, optical media, integrated circuits, or any other physical form of a document. The disclosure and claims herein expressly extend to verifying any physical form of a document, whether currently known or developed in the future, should be destroyed.

A document processing system allows specifying disposition of a document at the time a reservation for the document is created in the document processing system. A default disposition policy can be selected, a different defined disposition policy can be selected, or a new disposition policy can be created. Quality assurance processing after scanning assures all needed processing is performed for the paper document and the corresponding electronic document. Once the quality assurance processing is complete, the disposition of the document is scheduled according to the specified disposition policy for the document. When the specified disposition policy for a document indicates it needs to be destroyed, a user scans the unique identifier on the physical document at a first location, receives verification the document should be destroyed, and places the document in a container for documents to be destroyed. At a second location, a user scans the unique identifier on the document and receives verification the document should be destroyed. Once the user at the second location receives verification the physical document may be destroyed, the user can then destroy the physical document.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
    at least one processor;
    a memory coupled to the at least one processor;
    a document processing system residing in the memory and executed by the at least one processor, the document processing system comprising:
        a document disposition mechanism that provides a notification when a physical document should be destroyed, receives a first scan of a unique identifier on the document at a first location and provides first verification at the first location the document should be destroyed, receives a second scan of the unique identifier on the document at a second location, and provides second verification at the second location the document should be destroyed.

2. The apparatus of claim 1 wherein the document processing mechanism further comprises:
    a document reservation mechanism that allows a user of the document processing system to define metadata corresponding to the physical document during a reservation session for the physical document, where the metadata includes the unique identifier of a label that is applied to the physical document and further includes the disposition policy for the physical document.

3. The apparatus of claim 2 wherein the document disposition mechanism provides the notification when the physical document should be destroyed when the disposition policy for the physical document that was specified by the user during the reservation session for the physical document is satisfied.

4. The apparatus of claim 3 wherein the disposition policy comprises a default disposition policy.

5. The apparatus of claim 3 wherein the disposition policy comprises one of multiple default disposition policies that each correspond to a defined document type.

6. A method for verifying physical documents should be destroyed, the method comprising:
    scheduling disposition of a physical document according to a specified disposition policy for the physical document;
    providing a notification when the physical document should be destroyed according to the specified disposition policy for the physical document;
    in response to the notification, retrieving the physical document to a first location;
    performing a first scan in the first location of a unique identifier on the label on the physical document;
    in response to the first scan, providing a first prompt at the first location that verifies the physical document should be destroyed;
    in response to the first prompt, placing the physical document in a container of documents to be destroyed;
    scanning in a second location the unique identifier on the label on the physical document; and
    in response to the second scan, providing a second prompt at the second location that verifies the physical document should be destroyed.

7. The method of claim 6 further comprising the step of destroying the physical document.

8. The method of claim 6 wherein the specified disposition policy for the physical document is specified in metadata by a user during a reservation session for the physical document.

9. The method of claim 6 further comprising:
    allowing a user to define metadata corresponding to the physical document during a reservation session for the physical document, where the metadata includes the unique identifier of a label that is applied to the physical document and further includes the specified disposition policy for the physical document.

10. The method of claim 6 wherein the notification when the physical document should be destroyed is provided according to the specified disposition policy for the physical document that was specified by the user during the reservation session for the physical document.

11. The method of claim 6 wherein the specified disposition policy comprises a default disposition policy.

12. The method of claim 6 wherein the specified disposition policy comprises one of multiple default disposition policies that each correspond to a defined document type.

13. The method of claim 6 wherein after the first scan the physical document is placed in a container of documents to be destroyed that is transported to the second location.

14. The method of claim 13 wherein the second scan is performed by a person who retrieves the physical document from the container of documents to be destroyed to verify the document should be destroyed before destroying the document at the second location.

15. The method of claim 6 further comprising:
creating a reservation for the physical document;
specifying in the reservation for the physical document metadata corresponding to the physical document, where the metadata includes a unique identifier of a label that is applied to the physical document and further includes the specified disposition policy for the physical document;
applying the label to the physical document;
scanning the physical document to generate an electronic document corresponding to the physical document;
reading the unique identifier of the label in the electronic document;
linking the electronic document with the reservation for the physical document based on the unique identifier of the label; and
storing the electronic document in a database.

16. A method for verifying physical documents should be destroyed, the method comprising:
creating a reservation for a physical document;
specifying in the reservation for the physical document metadata corresponding to the physical document, where the metadata includes a unique identifier of a label that is applied to the physical document and further includes a disposition policy for the physical document;
applying the label to the physical document;
scanning the physical document to generate an electronic document corresponding to the physical document;
reading the unique identifier of the label in the electronic document;
linking the electronic document with the reservation for the physical document based on the unique identifier of the label;
storing the electronic document in a database;
scheduling disposition of the physical document according to the disposition policy for the physical document that was specified by the user during the reservation session for the physical document;
providing a notification when the physical document should be destroyed;
in response to the notification, retrieving the physical document to a first location;
scanning in the first location the unique identifier on the label on the physical document;
in response to the first scan, providing a first prompt at the first location that verifies the physical document should be destroyed;
scanning in a second location the unique identifier on the label on the physical document; and
in response to the second scan, providing a second prompt at the second location that verifies the physical document should be destroyed.

17. The method of claim 16 wherein after the first scan the physical document is placed in a container of documents to be destroyed that is transported to the second location.

18. The method of claim 17 wherein the second scan is performed by a person who retrieves the physical document from the container of documents to be destroyed to verify the document should be destroyed before destroying the document at the second location.

19. A method for verifying physical documents should be destroyed, the method comprising:
creating a reservation for a physical document;
specifying in the reservation for the physical document metadata corresponding to the physical document, where the metadata includes a unique identifier of a label that is applied to the physical document and further includes a disposition policy for the physical document;
applying the label to the physical document;
scanning the physical document to generate the electronic document;
reading the unique identifier of the label in the electronic document;
linking the electronic document with the reservation for the physical document based on the unique identifier of the label;
performing quality assurance processing related to the electronic document after the physical document has been scanned to produce the electronic document, wherein the quality assurance processing comprises:
comparing the electronic document to the physical document to assure the electronic document accurately represents the physical document;
verifying completeness and accuracy of the metadata corresponding to the physical document;
verifying the electronic document is written to a document management system;
verifying any needed workflows associated with the physical document and the electronic document are triggered;
building an audit trail for the physical document; and
taking corrective action if any of the quality assurance processing indicates corrective action is needed;
storing the electronic document in a database;
scheduling disposition of the physical document according to the disposition policy for the physical document that was specified by the user during the reservation session for the physical document;
providing a notification when the disposition policy for the physical document is satisfied indicating the physical document should be destroyed;
in response to the notification, retrieving the physical document to a first location;
scanning in the first location the unique identifier on the label on the physical document;
in response to the first scan, providing a first prompt at the first location that verifies the physical document should be destroyed;
scanning in a second location the unique identifier on the label on the physical document; and
in response to the second scan, providing a second prompt at the second location that verifies the physical document should be destroyed.

\* \* \* \* \*